May 11, 1954     W. J. ZENNER     2,678,118

FRICTION CLUTCH

Filed Jan. 11, 1951     2 Sheets-Sheet 1

INVENTOR
WALTER J. ZENNER
BY Emery Robinson
ATTORNEY

May 11, 1954   W. J. ZENNER   2,678,118
FRICTION CLUTCH

Filed Jan. 11, 1951   2 Sheets-Sheet 2

INVENTOR
WALTER J. ZENNER
BY Emery Robinson
ATTORNEY

Patented May 11, 1954

2,678,118

UNITED STATES PATENT OFFICE 2,678,118

FRICTION CLUTCH

Walter J. Zenner, Des Plaines, Ill., assignor to Teletype Corporation, Chicago, Ill., a corporation of Delaware Application January 11, 1951, Serial No. 205,526

2 Claims. (Cl. 192—75)

This invention relates to friction clutches and more particularly to a metallic high speed friction clutch for use in telegraph apparatus.

It is desirable that clutches used with telegraph apparatus be instantaneous in action and that there be a minimum degree of slippage between the clutch parts during engagement. Obviously such requirements are necessary inasmuch as the efficiency of operation of the telegraph apparatus is dependent upon the synchronous operation of the various elements in a telegraph system. For example, when signal impulses are received in a telegraph receiver selector magnet it is important to have a selector cam sleeve initiate rotation simultaneously with the reception of the first signal impulse.

Heretofore such clutches have been of the friction disc type wherein a felt disc is interposed between the clutch driving and driven members. In the copending application to A. N. Nilson et al., Serial No. 707,176, filed November 1, 1946, now Patent No. 2,568,249 there is disclosed a friction clutch wherein the engaging elements are made of metal such as cast iron. These clutches are satisfactory for use in telegraph apparatus not subjected to excessive loads over long periods of time.

The life of metallic friction clutches has been found to be relatively short; that is, slippage has been observed in the clutch parts after a period of use which makes the cost of the replacement of the clutch prohibitive in relationship to the cost of the other parts of the telegraph apparatus. Upon failure of the clutches due to excessive slippage between the engaging members they have been removed and examined under a microscope. Such observation reveals that the engaging surfaces of the clutch members have a mirrorlike appearance which has a high degree of luster. It is believed that this phenomenon is caused by metal flow of small protuberances on the surface of the engaging members. It is further believed that these protuberances are the result of the initial machining operations in the manufacture of the parts and/or small particles of metal chipped or broken from the metallic engaging members during operation of the clutch which have become fused to said surface.

It is the primary object of this invention to eliminate the deleterious effects of these protuberances.

A further object of the present invention contemplates an economical and simple clutch for use at high speeds over a long period of time wherein the engagement of the clutch members occurs with almost infinitesimal slippage.

With these and other objects in view the invention contemplates a driving clutch drum which is provided with a plurality of closely spaced transverse grooves to provide a number of lands which act as the engaging member of the driving portion of the clutch. Positioned within the driving drum is a plurality of expandable driven members. A lever is provided and is so positioned to expand the driven members into engagement with the driving members with great force.

Other objects and advantages of the present invention will be apparent from the following detailed description when considered in conjunction with the accompanying drawings, wherein.

Figure 1:
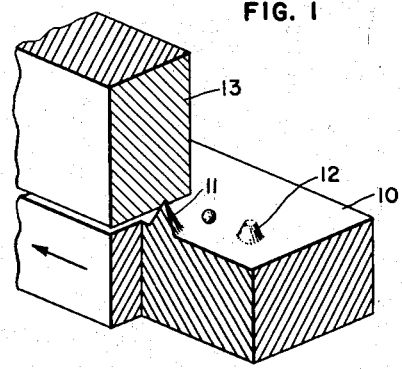
Fig. 1 shows a greatly enlarged perspective view of the engaging members of a clutch together with a number of protuberances on the surface of one of the engaging members.
Figure 2:
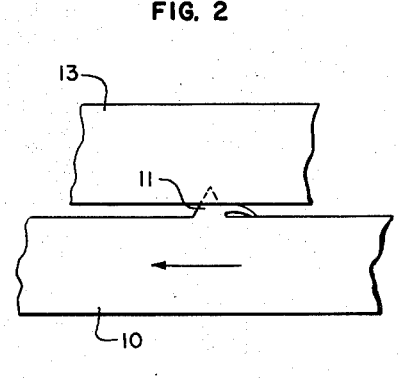
Fig. 2 is a greatly enlarged side elevational view of the engaging members of the clutch wherein one of the members strikes a protuberance on the surface of the other member.
Figure 3:
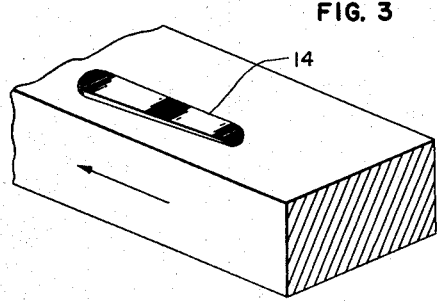
Fig. 3 is a greatly enlarged perspective view of one of the clutch members showing a protuberance which has been elongated by engagement of the clutch members.

With particular reference to Figs. 1, 2 and 3, the conditions to be alleviated by the present invention will now be described. In Fig. 1 a clutch member is designated by the reference numeral 10 and has on its engaging surface a number of typical protuberances 11 and 12. The engaging member 10 may be considered the driving member of the clutch and is preferably made of hardened steel. The protuberance 11 is a small particle of metal formed on the engaging surface during the original machining of the surface or formed during the original casting of the member 10. Protuberances may also be formed on the surface of the member 10 as a result of small metallic particles being wedged between the driving member 10 and a driven member 13. During such engagements of clutch members 10 and 13 at relatively high speeds a high degree of heat is generated by the engagement of these members with the small particles of metal positioned between the engaging members 10 and 13. When this occurs, the heat generated is sufficient to weld these small metallic particles to the face of either of the engaging members to form protuberances such as illustrated in Fig. 1 by reference numeral 12.

Referring now to Fig. 2, engaging member 13 is disclosed as striking a typical protuberance 11 during engagement of the members 10 and 13. As the member 13 is moved into engagement with the member 10 it engages the protuberance 11 and moves it along the face of the member 10. In the course of a number of such engagements the protuberance 11 is flattened out into an elongated smear 14 as shown in Fig. 3. Examination of this smear 14 under a microscope reveals that it is characterized by a mirrorlike surface with a high degree of luster.

Under normal conditions when a driven member 13 is urged into engagement with a driving member 10 the surfaces of the respective members possess a sufficient degree of natural roughness to maintain these members in engagement with each other. However, upon a vast number of repetitive engagements, protuberances such as 11 and 12 in Fig. 1 are progressively spread along the path of engagement to form smears such as designated by the reference numeral 14, shown in Fig. 3. These smears 14 when fully developed by repetitive engagement of the clutch members provide a mirrorlike surface which has a very low coefficient of friction and hence in reality provides a slide for the driven member 13. This condition results in the member 13 sliding relative to the member 10 on the smear 14. It has been observed that upon long continued repetitive engagement of metallic clutch elements that a smear may be extended over a long distance, whereby the degree of slip between the clutch members progressively increases.

In clutches utilized in the telegraph art it is necessary that engagement of the clutch elements be secured with a minimum variation of slip between the members. The variations associated with an average slip of one or two degrees may be tolerated. However, when the slip develops to such an extent as 5° average, the operation of the telegraph apparatus is impaired, necessitating the replacement of the clutch members 10 and 13. Tests reveal that the phenomenon of smearing proceeds at a very slow rate until a slip of 2° is encountered. Examination of engaging members performing with a 2° slip disclose only minute formations of smears. Once the engaging members start to slip in amounts greater than 2° the smears are observed to develop in length very rapidly. Corresponding with the rapid growth of the smears, an increased degree of slip is noted between the engaging members.

Figure 4:
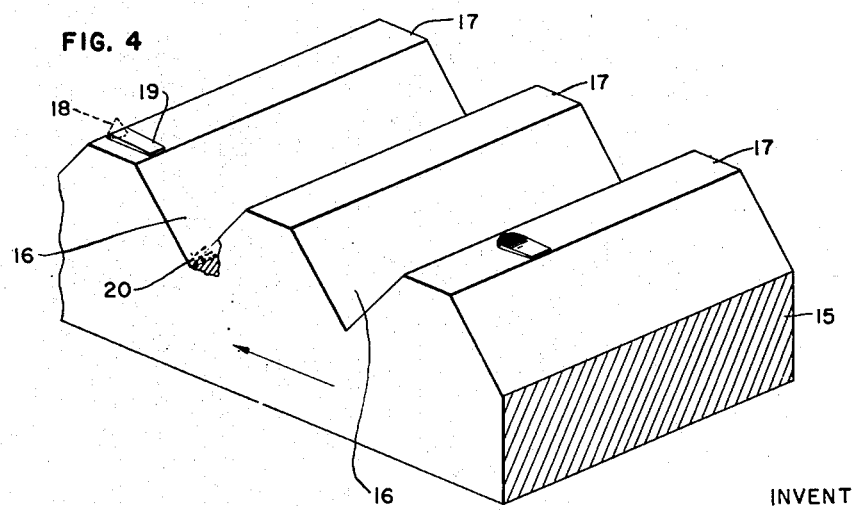
Fig. 4 is a greatly enlarged perspective view of a grooved engaging member embodying the features of the present invention.

Referring to Fig. 4 there is disclosed an engaging member 15 having formed therein a plurality of grooves 16 to form a number of lands 17. By so forming the engaging member, the pernicious effect of smearing is substantially eliminated. This is apparent when considering a protuberance 18 which has been repetitively engaged by a clutch member to spread it into an elongated smear 19. The smear 19 proceeds to develop as previously described until it reaches the edge of the land 17 whereupon the engaging clutch member breaks the smear and causes it to drop as debris 20 into the groove 16 between a pair of the lands 17. Therefore, it is apparent that the length of the smear is severely curtailed so that its development cannot take place over a distance to span two adjacent lands. Hence a smear developed on the land 17 has no effect on the natural roughness of the surface of the adjacent lands and thus when the engaging members of the clutch are brought together there is still a portion of the engaging surface provided with the material's natural roughness. Upon continuous repetitive engagement of the clutch members the smear 19 is eventually worn or rubbed off to restore the surface of the land 17 to its natural state of roughness.

Figure 5:
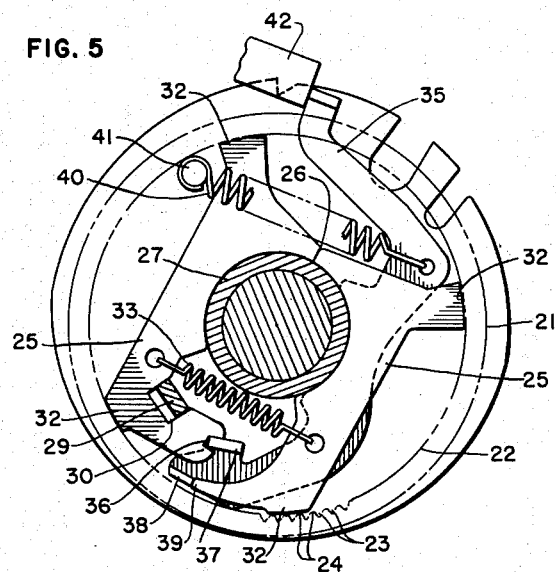
Fig. 5 is an elevational view of a typical clutch embodying the principal features of the invention.

In Fig. 5 there is disclosed a clutch similar to the clutch disclosed in the aforementioned Nilson et al. patent. This patent is incorporated in the present application by reference since this application describes in great detail the functions of the elements comprising this clutch. So much of this clutch only will be described as to make the present invention apparent.

The clutch comprises a metallic driving member 21 in the form of a drum having an inner-peripheral surface 22. The surface 22 is provided with a plurality of grooves 23 to form a number of lands 24 parallel to the axis of the drum 21. The drum 21 may be driven from any suitable driving source (not shown). Positioned within the drum 21 is a pair of frames 25 abutting each other at pivot point 26 and adapted to surround a driven sleeve 27 of the driven member. A stud 29 secured to the driven member is positioned to engage one of the frames 25 within a notch 30 formed in said frame. Therefore, rotative movement of the frames 25 is imparted through the stud 29 to rotate the driven member. A pair of smooth faced metallic friction shoes 32 are integrally formed on each of the frames 25. Normally the shoes 32 are urged out of engagement with the inner-peripheral surface 22 of the driving drum 21 by a spring 33 interconnecting the two frames to urge them together about their pivot point 26.

An actuator lever 35 is provided for urging the shoes into engagement with the inner-peripheral surface 22 of the driving member 21. This actuator lever is mounted within a slot (not shown) in the sleeve 27 and is maintained in position by a notch 36 which engages a projection 37 on the actuator arm 35. A second projection 38 also formed on the actuator arm 35 engages the tip 39 of the right hand frame 25. A spring 40 connected to the actuator arm 35 and to a stud 41 attached to the driven member (not shown) urges the actuator arm about an imaginary center between the projections 37 and 38. The spring 40 is strong enough to normally overcome the effect of the spring 33 and hence movement of the actuator 35 about its imaginary center urges the frames 25 outwardly about their pivot point 26 to force the smooth faced shoes 32 into engagement with the inner-peripheral surface 22 of the driving member 21.

A movable stop 42 is provided to engage the actuator arm 35 to rotate it about its imaginary rotative center located between the projections 37 and 38 in a counterclockwise direction to allow the spring 33 to move the shoes 32 out of engagement with the inner-peripheral surface 22. Upon release of the stop 42, the actuator arm 35 rotates about its imaginary pivot point between the projections 37 and 38 under the influence of the spring 40 whereby the shoes 32 are urged outwardly into engagement with the driving member 21. Therefore, in operation, the train of power through the clutch may be traced through the driving member 21, through the shoes 32, to the stud 29 and hence to the driven member.

Figure 6:
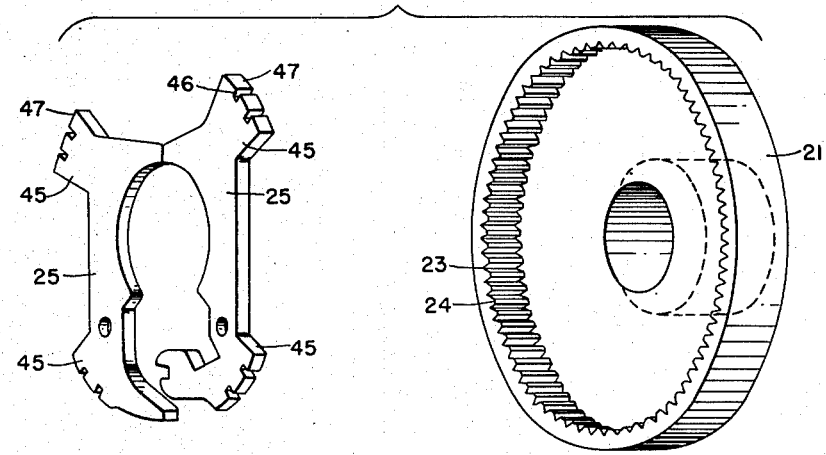
Fig. 6 is an exploded perspective view of a driving drum and driven shoes embodying the features of the invention.

Referring to Fig. 6, the transverse grooves 23 and lands 24 are shown as being formed around the entire inner-peripheral surface of the driving member 21. Frames 25 are shown as having modified shoes 45 in which a plurality of slots 46 are formed. These slots are sufficiently spaced apart so that lands 47 formed by the slots cannot engage within the grooves 23; that is, the lands 47 are sufficiently wide to span any of the slots 23. The slots 46 are formed for the purpose of scraping oil and dust off of the lands 24 on the inner-peripheral surface 22 to maintain the engaging surfaces free of foreign matter which may reduce the coefficient of friction between the engaging members. These slots are sufficiently deep to provide an exit for all of the scraped oil and dust without subsequent clogging of the slots.

The shoes 32 and 45 are sufficiently wide to span at least three of the lands 24. Therefore, smears developed from protuberances formed on one or two of the lands 24 will not affect the frictional engagement of the shoes 32 or 45 with the other lands 24. The chances of smears developing on all three lands are very remote and hence one land 24 with its natural roughness is always available for engagement with one of the shoes 32 or 45. During normal operation of the clutch, smears will be continually developed on the various lands and at the same time the previously developed smears are worn off by the action of the shoes 32 or 45 rubbing against these lands. It may be readily appreciated, therefore, that as smears develop on one land the shoes are continually acting to rub previously developed smears off of other lands so that at all times enough lands devoid of smears are provided for the efficient operation of the clutch. Optimum results are obtained by making the engaging area of the lands formed by the grooves 23 cover 20% to 60% of the surface area of a normally smooth driving drum 21.

Figure 7:
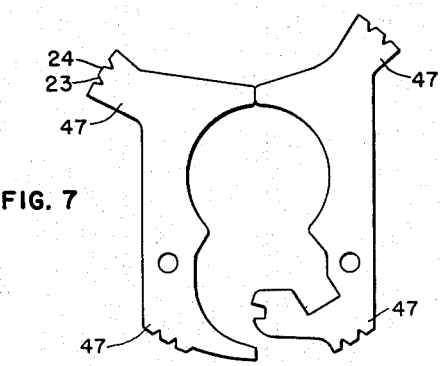
Fig. 7 is a side elevational view of a modified driven member of a clutch.

In Fig. 7 there is disclosed a modified engaging element wherein the grooves 23 and lands 24, to prevent the formation of smears, are provided on the shoes 47. Under test it has been found that smears sometimes develop more readily on the shoes than on the driving drum and hence it becomes necessary to provide the shoes of the driven member with the anti-smearing lands 24 and grooves 23.

It is to be understood that the above described arrangement of clutch elements and construction of engaging members are simply illustrative of the applications of the principles of the invention and many of the modifications may be made without departing from the scope of the invention.

What is claimed is:

1. In a friction clutch, a metallic driving drum adapted to be continually rotated, a plurality of closely spaced first lands formed along the entire inner peripheral surface of the drum, said first lands forming a small portion of the normal surface area of said inner peripheral surface, said first lands having microscopic metallic protuberances fused or formed thereon, a plurality of metallic shoes positioned within the drum, said shoes having slots formed therein to provide a plurality of second lands, said second lands being of sufficient length to preclude fitting between the grooves defined by the first lands, and means for moving the shoes toward the drum to engage the second lands with the first lands, said second lands engaging the first lands with sufficient force to cause flow of the metallic protuberances into elongated smears, said flow of the protuberances continuing upon each engagement of the lands until said smeared protuberances extend from the first lands whereupon subsequent engagement of the second lands breaks off the extending portions of the smeared protuberances.

2. In a friction clutch, a plurality of metallic driven shoes having arcuate engaging surfaces, the arc of each engaging surface forming a widely spaced segment of a circle, the total length of all said arcs forming substantially less than one-half the circumference of said circle, a metallic driving drum adapted to be continuously rotated, a plurality of closely spaced lands formed along the entire inner peripheral surface of the drum, said lands being formed close enough together so that at least three of said lands are always positioned in register with each shoe, each of said lands having formed thereon microscopic metallic protuberances, and means for forcibly moving said shoes into engagement with said lands whereby the protuberances are progressively flattened and elongated into smears, said forcing means imparting forces of sufficient magnitude to said shoes to break off any smears which extend over the edges of the lands, said forcing means imparting forces of sufficient magnitude to said shoes to progressively wear away said smeared protuberances.

References Cited in the file of this patent

UNITED STATES PATENTS

| Number | Name | Date |
|---|---|---|
| 385,659 | Brownley | July 3, 1888 |
| 1,160,971 | Bullock | Nov. 16, 1915 |
| 1,657,265 | Ludwig | Jan. 24, 1928 |
| 2,150,186 | Pope | Mar. 14, 1939 |
| 2,295,503 | Miller | Sept. 8, 1942 |
| 2,533,480 | Leininger et al. | Dec. 12, 1950 |
| 2,568,249 | Nilson et al. | Sept. 18, 1951 |

FOREIGN PATENTS

| Number | Country | Date |
|---|---|---|
| 193,064 | Great Britain | 1923 |